United States Patent
Novoa et al.

(10) Patent No.: US 10,684,904 B2
(45) Date of Patent: Jun. 16, 2020

(54) INFORMATION HANDLING SYSTEMS AND METHODS TO SELECTIVELY CONTROL OWNERSHIP OF A HARDWARE BASED WATCHDOG TIMER (WDT)

(71) Applicant: DELL PRODUCTS L.P., Round Rock, TX (US)

(72) Inventors: Manuel Novoa, Leander, TX (US); Wai Ming R. Chan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 98 days.

(21) Appl. No.: 16/193,651

(22) Filed: Nov. 16, 2018

(65) Prior Publication Data

US 2020/0159543 A1    May 21, 2020

(51) Int. Cl.
G06F 11/07    (2006.01)
G06F 9/4401   (2018.01)

(52) U.S. Cl.
CPC ........ G06F 11/0757 (2013.01); G06F 9/4401 (2013.01); G06F 9/4411 (2013.01)

(58) Field of Classification Search
CPC ... G06F 9/4401; G06F 9/4411; G06F 11/0757
See application file for complete search history.

(56) References Cited

U.S. PATENT DOCUMENTS

| | | | | |
|---|---|---|---|---|
| 2003/0037172 A1* | 2/2003 | Lacombe | ............ | G06F 11/0757 719/310 |
| 2005/0278526 A1* | 12/2005 | Dunstan | ................ | G06F 9/4403 713/165 |
| 2016/0378587 A1* | 12/2016 | Zhang | ................... | G06F 11/079 714/55 |

OTHER PUBLICATIONS

Intel, Using the Intel ICH Family Watchdog Timer (WDT), Application Note. AP-725, Sep. 2002, 31 pgs.
Microsoft Corporation, "Hardware Watchdog Timers Design Specification", 2006, 12 pgs.
David Madore, "Testing the Intel TCO watchdog using Ubuntu live", Sep. 14, 2016, 6pgs.
Mika Westerberg, "ACPI/watchdog: Add support for WDAT (Watchdog Action Table)", Sep. 20, 2016, 3 pgs.
Microsoft Corporation, "About Multimedia Timers", May 30, 2018, 1 pg.

(Continued)

*Primary Examiner* — Glenn A. Auve
(74) *Attorney, Agent, or Firm* — Egan Peterman Enders Huston

(57) ABSTRACT

Embodiments of information handling systems and methods are provided herein to selectively control ownership of a hardware watchdog timer (WDT) provided on a system platform of an information handling system (IHS), which is configured to store and execute boot firmware, an operating system (OS) and one or more user applications. One embodiment of a method disclosed herein may include receiving user input in a boot setup utility of the boot firmware to select between OS-ownership and user application-ownership of the hardware WDT during OS runtime, and controlling ownership of the hardware WDT during OS runtime based on the user input received in the boot setup utility. Another embodiment of a method disclosed herein may authorize one or more user applications prior to controlling ownership of the hardware WDT during OS runtime, so that only authorized user applications are enabled to use the hardware WDT.

20 Claims, 7 Drawing Sheets

(56) References Cited

OTHER PUBLICATIONS

Microsoft Corporation, "Canceling a Timer Event", May 30, 2018, 2 pgs.
Microsoft Corporation, "Obtaining and Setting Timer Resolution", May 30, 2018, 2 pgs.
Microsoft Corporation, "Starting a Single Timer Event", May 30, 2018, 2 pgs.
Microsoft Corporation, "Writing a Timer Callback Function", May 30, 2018, 2 pgs.

* cited by examiner

| First Watchdog Timer Action Table (WDAT) 126 | | |
|---|---|---|
| Field | Byte Length | Description |
| *ACPI Standard Header* | | |
| Header Signature | 4 | 'WDAT' |
| Length | 4 | Length, in bytes, of entire WDAT |
| Revision | 1 | 1 |
| Checksum | 1 | Entire table must sum to zero |
| OEMID | 6 | OEM ID |
| OEM Table ID | 8 | Manufacturer model ID |
| OEM Revision | 4 | OEM revision of the WDAT |
| Creator ID | 4 | Vendor ID of the utility that created the table |
| Creator Revision | 4 | Revision of the utility that created the table |
| *Watchdog Header* | | |
| Header Length | 4 | Length of the Watchdog Header |
| PCI Segment | 2 | PCI Segment number (0XFF if not PCI device) |
| PCI Bus Number | 1 | PCI Bus Number (0xFF if not a PCI device) |
| PCI Device Number | 1 | PCI Device Number (0xFF if not a PCI device) |
| PCI Function # | 1 | PCI Function Number (0xFF if not a PCI device) |
| Reserved | 3 | |
| Timer Period | 4 | Period of one count (in ms) supported by WDT |
| Timer Max Count | 4 | Maximum counter value supported by the WDT |
| Timer Min Count | 4 | Minimum counter value supported by the WDT |
| Watchdog Flags | 1 | Watchdog flags (1= set, 0= not set) |
| Reserved | 3 | |
| # of Instr. Entries | 4 | Number of watchdog entries in the table |
| *Watchdog Action Table* | | |
| Instruction Entries | | A series of one or more instruction entries |

*FIG. 2*

| Second Watchdog Timer Action Table (DWDT) 128 | | |
|---|---|---|
| Field | Byte Length | Description |
| *ACPI Standard Header* | | |
| Header Signature | 4 | 'DWDT' |
| Length | 4 | Length, in bytes, of entire DWDT |
| Revision | 1 | 1 |
| Checksum | 1 | Entire table must sum to zero |
| OEMID | 6 | OEM ID |
| OEM Table ID | 8 | Manufacturer model ID |
| OEM Revision | 4 | OEM revision of the DWDT |
| Creator ID | 4 | Vendor ID of the utility that created the table |
| Creator Revision | 4 | Revision of the utility that created the table |
| *Watchdog Header* | | |
| Header Length | 4 | Length of the Watchdog Header |
| PCI Segment | 2 | PCI Segment number (0XFF if not PCI device) |
| PCI Bus Number | 1 | PCI Bus Number (0xFF if not a PCI device) |
| PCI Device Number | 1 | PCI Device Number (0xFF if not a PCI device) |
| PCI Function # | 1 | PCI Function Number (0xFF if not a PCI device) |
| Reserved | 3 | |
| Timer Period | 4 | Period of one count (in ms) supported by WDT |
| Timer Max Count | 4 | Maximum counter value supported by the WDT |
| Timer Min Count | 4 | Minimum counter value supported by the WDT |
| Watchdog Flags | 1 | Watchdog flags (1= set, 0= not set) |
| Reserved | 3 | |
| # of Instr. Entries | 4 | Number of watchdog entries in the table |
| *Watchdog Action Table* | | |
| Instruction Entries | | A series of one or more instruction entries |

*FIG. 3*

INFORMATION HANDLING SYSTEMS AND METHODS TO SELECTIVELY CONTROL OWNERSHIP OF A HARDWARE BASED WATCHDOG TIMER (WDT)

FIELD

This invention relates generally to information handling systems, and more particularly, to information handling systems and methods for using a platform hardware timer as a watchdog timer (WDT).

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems (IHSs) typically include a boot system such as, for example, a Basic Input/Output System (BIOS) and/or a Unified Extensible Firmware Interface (UEFI) that operates to perform hardware initialization during the boot process (power-on startup) and/or system reset, and to provide runtime services for operating systems and programs. For example, the boot system may initialize and test the IHS hardware components, load an operating system (OS) from memory or storage device, and/or perform a variety of other actions known in the art during a boot process. The boot system includes boot firmware that is stored in non-volatile memory, such as a Flash memory device or read only memory (ROM) device. Upon system start-up or restart, a boot loader or boot block is executed to access the boot firmware and execute the boot code. The boot firmware has control of the system platform during the pre-boot phase of the boot firmware, i.e., the duration of time between a system restart/reboot and the loading of the OS. Once the OS is loaded and running, however, platform control shifts to the operating system (i.e., during OS runtime).

A watchdog timer (WDT) is an electronic timer that may be used to detect and recover from information handling system malfunctions. For example, a watchdog timer may be initiated in response to the boot process and may be configured to expire or "trip" after a predetermined time period that is indicative of a problem with the boot process. In addition to monitoring the boot process, a WDT may be used to detect a variety of hardware and software errors. If a WDT expires (e.g., due to a hardware fault, program error, intentional hardware reset initiation, or time expiration), a time out signal may be generated, a WDT flag may be set, and corrective action(s) may be taken (e.g., reboot the system, shut down the system, log the error event, run diagnostics, etc.) to recover from the error.

There are generally two types of watchdog timers: hardware WDTs and software WDTs. A hardware WDT is a hardware based monitoring circuit (e.g., logic circuitry provided on the system platform) and has an associated WDT driver, which is executable to configure the monitoring circuit, stop the timer before it expires if the monitored task is completed, reset the timer before it expires for a monitored task running for longer than the WDT timeout value, and reset the timer and take corrective action(s) to recover from an error if the timer expires. During the boot process, the boot firmware has sole ownership of the hardware WDT before control or ownership of the hardware WDT is passed to the operating system during the boot firmware to OS transition. Once ownership passes to the operating system, the hardware WDT is reserved for sole use by the OS kernel and typically cannot be used by other user applications, services or drivers. In most cases, user applications/services/drivers are limited to software based WDT services provided by the operating system. While software WDTs can be used to monitor and recover from soft hangs (i.e., errors in program code that prevent the system from making forward progress), any OS hang condition, intentional termination of the software WDT, or OS fault may leave the system in an indefinite hung state. This may constitute an unacceptable amount of risk for some critical and/or security sensitive applications, services or drivers.

SUMMARY OF THE INVENTION

The following description of various embodiments of information handling systems and related methods is not to be construed in any way as limiting the subject matter of the appended claims.

According to one embodiment, an information handling system provided herein may include a hardware watchdog timer (WDT) provided on a system platform of the IHS, a computer readable storage medium, a computer readable non-volatile memory and a host processing device. The computer readable storage medium may be generally configured to store an operating system (OS) and OS level applications, services and drivers, such as user applications, a watchdog timer driver (WDT_DRV) and a watchdog application program interface (WDT_API). The computer readable non-volatile memory may be generally configured to store boot firmware and Advanced Configuration and Power Interface (ACPI) firmware. The host processing device may be generally configured to execute program instructions within the boot firmware when the IHS is booted before the OS is loaded into a system memory of the IHS and executed by the host processing device during OS runtime.

In the present disclosure, the boot firmware stored within computer readable non-volatile memory includes a boot setup utility, which enables a user to select between OS-ownership and user application-ownership of the hardware WDT during OS runtime. When OS-ownership of the hardware WDT is selected in the boot setup utility, the operating system retains sole access to and use of the hardware WDT during OS runtime. However, when user application-ownership of the hardware WDT is selected in the boot setup utility, program instructions within the watchdog timer driver are executed by the host processing device to enable one or more user applications to use the hardware WDT during OS runtime.

When the IHS is booted, the ACPI firmware may use boot services of the boot firmware to construct a plurality of ACPI tables corresponding to the hardware WDT, which are stored within computer readable non-volatile memory. These ACPI tables include a first watchdog timer action table (WDAT) specified for the operating system and a second watchdog timer action table (DWDT) specified for the one or more user applications. The first watchdog timer action table may be loaded into system memory when the IHS is booted if the user selects OS-ownership of the hardware WDT in the boot setup utility. On the other hand, the second watchdog timer action table may be loaded into system memory when the IHS is booted if the user selects user application-ownership of the hardware WDT in the boot setup utility.

The second watchdog timer action table (DWDT) may specify at least one watchdog action to be performed for the one or more user applications if the hardware WDT reaches a timeout value, which is specified by the one or more user applications and used to configure the hardware WDT. In some embodiments, multiple user applications may share the hardware WDT. In some embodiments, the multiple applications may use the same timeout value. In other embodiments, a first timeout value may be specified for a first one of the user applications and a second timeout value may be specified for a second one of the user applications, wherein the second timeout value differs from the first timeout value.

The watchdog application program interface (WDT_API) may generally include program instructions that are executable by the host processing device to control access to the watchdog timer driver (WDT_DRV). In some embodiments, the program instructions of the watchdog application program interface (WDT_API) may be executable by the host processing device to authorize one or more user applications and allow only the authorized user applications to access the watchdog timer driver (WDT_DRV) during OS runtime. In some embodiments, the program instructions of the watchdog application program interface (WDT_API) may be executable by the host processing device to authorize multiple user applications to access the watchdog timer driver (WDT_DRV) and share the hardware WDT during OS runtime.

In some embodiments, the program instructions of the watchdog application program interface (WDT_API) may be executable by the host processing device to authorize at least one user application and bind the at least one user application to the watchdog timer driver only if the at least one user application is authorized. In one embodiment, the at least one user application may be authorized if a unique identifier and a binding key provided by the at least one user application matches a corresponding identifier and binding key maintained by the watchdog application program interface (WDT_API). In one embodiment, the unique identifier may be a data string that uniquely identifies the at least one user application or a vendor that created the user application, and the binding key may be a shared secret key provided by a manufacturer of the IHS to the at least one user application. In another embodiment, the binding key may be a hash-based message authentication code (HMAC) generated, for example, by hashing the unique identifier with a private key maintained by the manufacturer of the IHS.

According to another embodiment, a method is provided herein to selectively control ownership of a hardware watchdog timer (WDT) during OS runtime. In general, the method may include receiving user input in a boot setup utility of the boot firmware to select between OS-ownership and user application-ownership of the hardware WDT during OS runtime, and controlling ownership of the hardware WDT during OS runtime based on the user input received in the boot setup utility.

After ownership is selected, the information handling system may be rebooted, and either a first watchdog timer action table (WDAT) specified for the operating system or a second watchdog timer action table (DWDT) specified for the one or more user applications may be loaded into a system memory of the information handling system in response to said rebooting. For example, the method may load the first watchdog timer action table (WDAT) if the received user input selects OS-ownership in the boot setup utility, or the second watchdog timer action table (DWDT) if the received user input selects user application-ownership in the boot setup utility, into system memory.

In some embodiments, the method may enable the operating system to take ownership of the hardware WDT during OS runtime if OS-ownership is selected in the boot setup utility. On the other hand, the method may enable one or more user applications to take ownership of the hardware WDT during OS runtime if user application-ownership is selected in the boot setup utility. If user application-ownership is selected, the method prevents the operating system from taking ownership of the hardware WDT during OS runtime. In some embodiments, the method may allow only authorized user applications to take ownership of the hardware WDT during OS runtime. In some embodiments, the method may authorize a plurality of user applications to share the hardware WDT during OS runtime.

According to yet another embodiment, a method is provided herein to authorize one or more user applications to use a hardware watchdog timer (WDT) during OS runtime. In general, the method may include receiving a unique identifier and a binding key from at least one user application, and comparing the received unique identifier and binding key to a corresponding identifier and binding key maintained within the information handling system. The method may authorize the at least one user application if the received unique identifier and binding key match the corresponding identifier and binding key maintained with the IHS, and may enable the at least one user application to use the hardware WDT during OS runtime only if the at least one user application is authorized. In some embodiments, the at least one user application may be enabled by binding the at least one user application to a watchdog timer driver (WDT_DRV), which is configured to access, configure and use the hardware WDT during OS runtime.

BRIEF DESCRIPTION OF THE DRAWINGS

Other advantages of the present disclosure will become apparent upon reading the following detailed description and upon reference to the accompanying drawings in which:

FIG. 2 is a first watchdog timer action table (WDAT) specified for an operating system;

FIG. 3 is a second watchdog timer action table (DWDT) specified for one or more user applications;

Figure 1:
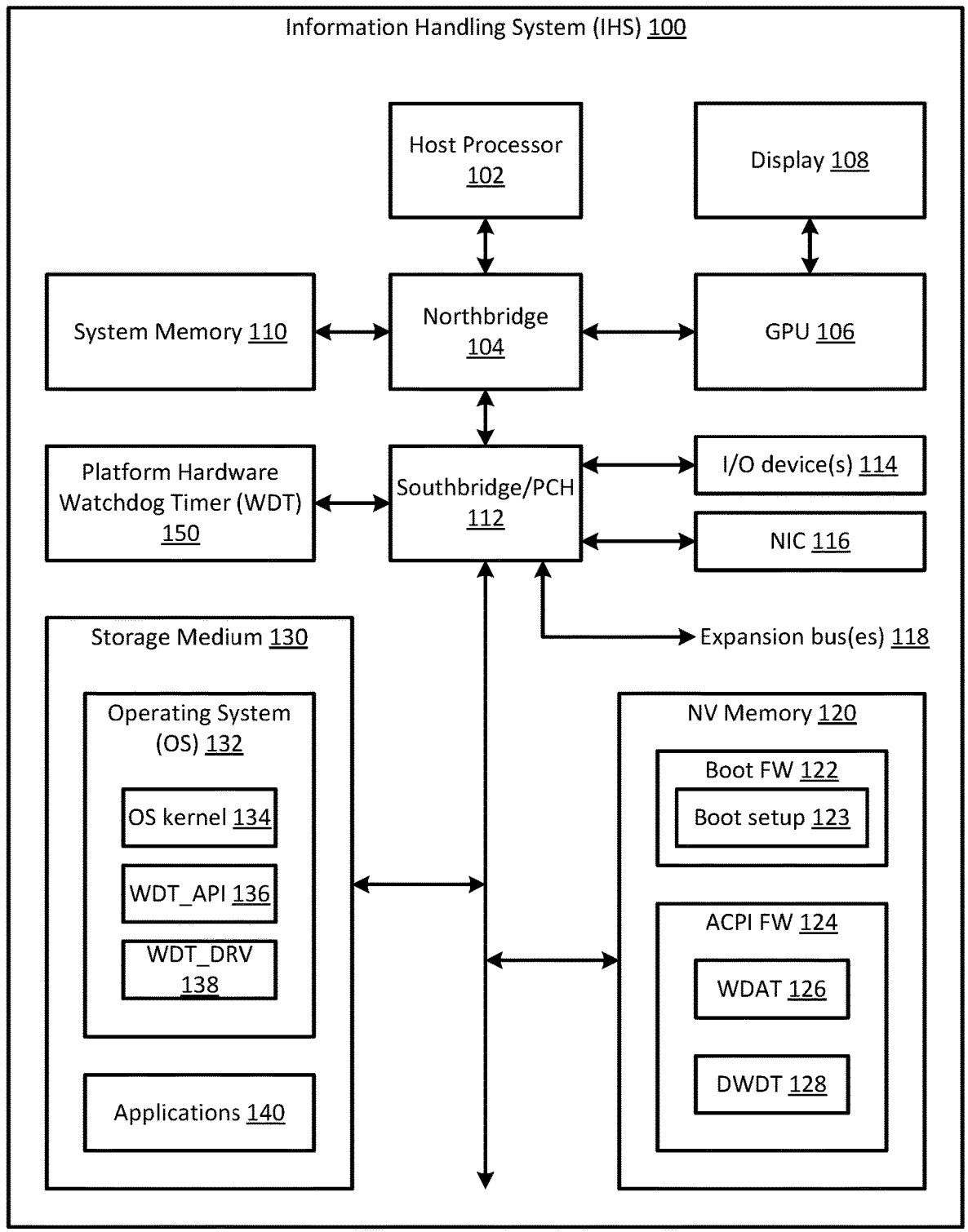
FIG. 1 is a block diagram illustrating one embodiment of an information handling system (IHS) including a hardware watchdog timer (WDT) on a system platform of the IHS.

While the present disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the present disclosure is to cover all modifications, equivalents and alternatives falling within the spirit and scope of the present disclosure as defined by the appended claims.

DESCRIPTION OF ILLUSTRATIVE EMBODIMENTS

FIG. 1 is a block diagram of an information handling system (IHS) 100 as it may be configured according to one embodiment of the present disclosure. In this regard, it will be understood that the IHS configuration shown in FIG. 1 is exemplary only, and that the disclosed methods may be implemented on any type of information handling system. It will be further understood that while certain components of the information handling system are shown in FIG. 1 for illustrating embodiments of the present disclosure, the information handling system disclosed herein is not restricted to including only those components shown in FIG. 1 and described below.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may generally include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

Turning to FIG. 1, information handling system (IHS) 100 may generally include one or more host processing devices 102. Examples of host processing device(s) 102 include various types of programmable integrated circuits (e.g., a processor such as a controller, microcontroller, microprocessor, ASIC, etc.) and programmable logic devices (such as a field programmable gate array "FPGA", complex programmable logic device "CPLD", etc.). Host processing device(s) 102 may include any processor or processing device capable of executing program instructions. According to one embodiment, host processing device(s) 102 may include at least one central processing unit (CPU) having one or more processing cores. The CPU may include any type of processing device, such as an Intel Pentium series processor, an Advanced Micro Devices (AMD) processor or another processing device. In some embodiments, host processing device(s) 102 may include other types of processing devices including, but not limited to, a graphics-derivative processor (such as a physics/gaming processor), a digital signal processor (DSP), etc.

Northbridge controller or chipset 104 is directly connected to host processing device(s) 102, and is configured to coordinate communication between host processing device(s) 102 and one or more IHS components. In the embodiment of FIG. 1, for example, northbridge controller 104 is coupled to graphics processor unit (GPU) 106 and system memory 110. Although illustrated as a separate component in FIG. 1, northbridge controller 104 may be integrated into host processing device 102, for example, when host processing device 102 is implemented as a silicon-on-chip (SoC) processor.

GPU 106 is coupled to host processor 102 to coordinate communication between the host processor and one or more display components of the IHS. GPU 106 is coupled to display device 108 to provide visual images to the user, and in some embodiments, may be coupled to one or more display ports to support additional display functions. Display device 108 may be a display screen embedded within the chassis of the IHS, or an external display screen or monitor coupled to the IHS. Although GPU 106 is illustrated as a separate integrated circuit chip (coupled to host processor 102 via a bus), GPU 106 may be integrated with host processor 102 when the host processor is implemented as a silicon-on-chip (SoC) processor.

System memory 110 is configured to store program instructions and/or data, which is accessible and executable by host processing device(s) 102. System memory 112 may be implemented using any suitable memory technology, including but not limited to, random access memory (RAM), static RAM (SRAM), synchronous dynamic RAM (SDRAM), nonvolatile/Flash-type memory, or any other type of memory.

In some embodiments, southbridge controller 112 may be coupled to northbridge controller 104 via an internal bus. In other embodiments, southbridge controller 112 may be replaced by a platform controller hub (PCH) and connected directly to host processing device 102 via a direct media interface (DMI). Southbridge controller/PCH 112 handles I/O operations for the IHS, and thus, may include a variety of communication interfaces and ports for communicating with various system components, such as input/output (I/O) devices 114, network interface card (NIC) 116, expansion bus(es) 118, computer readable non-volatile memory 120, and computer readable storage medium 130. Examples of communication interfaces and ports that may be included within southbridge controller/PCH 112 include, but are not limited to, a Peripheral Component Interconnect (PCI) interface, a PCI-Express (PCIe) interface, a Universal Serial Bus (USB) interface, a Serial Peripheral Interface (SPI), an Enhanced SPI (eSPI), a Serial AT Attachment (SATA) interface, a Low Pin Count (LPC) interface, an Inter-IC Sound ($I^2S$) interface, etc. Examples of expansion bus(es)

118 that may be coupled to southbridge controller/PCH 112 include, but are not limited to, a PCI bus, a PCIe bus, a SATA bus, a USB bus, etc.

I/O devices 114 enables a user to interact with IHS 100. In some embodiments, one or more I/O devices 114 may be present within, or coupled to, IHS 100. In some embodiments, I/O device(s) 114 may be separate from the IHS and may interact with the IHS through a wired or wireless connection. Examples of I/O devices 114 include, but are not limited to, keyboards, keypads, touch screens, scanning devices, voice or optical recognition devices, and any other devices suitable for entering or retrieving data. As such, I/O devices 114 may be generally configured to receive input data from a user or display output data to the user. In some embodiments, a user may provide input data via an I/O device 114 to a boot firmware setup utility to selectively control ownership of a hardware based watchdog timer (WDT) service.

NIC 116 enables IHS 100 to communicate with one or more remote devices, systems and/or services via an external network using one or more communication protocols. The external network may be a local area network (LAN), wide area network (WAN), personal area network (PAN), or the like, and the connection to and/or between IHS 100 and the network may be wired, wireless or a combination thereof. NIC 116 may communicate data and signals to/from IHS 100 using any known communication protocol.

Computer readable storage medium 130 is generally configured to store software and/or data, and may be any type of persistent, non-transitory computer readable storage medium, such as one or more hard disk drives (HDDs) or solid-state drives (SSDs). In some embodiments, computer readable storage medium 130 may be configured to store at least one operating system (OS) 132 for the IHS, in addition to one or more user applications 140 and (optionally) user data. OS 132 and user application(s) 140 may generally contain program instructions, which may be executed by host processing device(s) 102 to perform various tasks and functions for the information handling system and/or for the user. In some embodiments, user application(s) 140 may include at least one critical or security sensitive application, service or driver that would benefit from using a hardware based watchdog timer (WDT) service.

Computer readable memory 120 is generally configured to store software and/or firmware modules, and may include any type of non-volatile (NV) memory including, but not limited to, read-only memory (ROM), flash memory, and non-volatile random access memory (NVRAM). The software and/or firmware modules stored within computer readable NV memory 120 may generally contain program instructions (or computer program code), which may be executed by host processing device(s) 102 to instruct components of IHS 100 to perform various tasks and functions for the information handling system. In the embodiment shown in FIG. 1, computer readable NV memory 120 stores boot firmware (FW) 122 and Advanced Configuration and Power Interface (ACPI) firmware 124.

Boot firmware 122 includes software and/or firmware modules for specifying hardware configuration settings, system time and boot sequence, etc. In some embodiments, boot firmware 122 may be implemented as a Basic Input/Output System (BIOS) and/or a Unified Extensible Firmware Interface (UEFI), and may include a boot setup utility 123 that enables a user to specify hardware configuration settings, system time, boot sequence, and other aspects of the boot process. For purposes of this disclosure, a "user" may refer to an end user, a system administrator or a platform owner.

When IHS 100 is powered on or rebooted, program instructions within boot firmware 122 may be executed by host processing device(s) 102 to configure hardware components of the IHS, perform a Power-On Self-Test (POST) to ensure the hardware configuration is valid and working properly, discover and initialize devices and launch a bootloader to load OS 132. Once launched, the bootloader within boot firmware 122 retrieves OS 132 from computer readable storage medium 130 and loads it into system memory 110. Boot firmware 122 has control of the system platform during the pre-boot phase of the boot firmware, i.e., the duration of time between a system restart/reboot and the loading of OS 132. Once the OS is loaded and running, platform control shifts to the operating system (i.e., during OS runtime).

During the pre-boot phase, a user may access the boot setup utility 123 of the boot firmware 122 to make changes to hardware configuration settings, system time, boot sequence, and other aspects of the boot process. According to one embodiment of the present disclosure, a user may utilize the boot setup utility 123 to selectively enable/disable a hardware based watchdog timer (WDT) service and control ownership of the hardware based WDT service. For example, and as described in more detail below, a user may use boot setup utility 123 to disable or enable the hardware based WDT service during OS runtime. If the hardware based WDT service is enabled for use during OS runtime, the use may use boot setup utility 123 to select either OS-ownership or user application-ownership of the hardware based WDT service during OS runtime.

The Advanced Configuration and Power Interface (ACPI) is an open standard that operating systems can use to discover and configure computer hardware components and to perform power management, thermal management and status monitoring. ACPI serves as an interface layer between boot firmware 122 and OS 132. The latest version of the ACPI specification may be found on the Unified Extensible Firmware Interface (UEFI) Forum website (http://uefi.org/specifications) and is incorporated herein in its entirety.

The ACPI firmware 124 stored within NV memory 120 includes ACPI tables, ACPI BIOS and ACPI registers and provides OS-independent interfaces between the platform hardware and OS-specific technologies, interfaces and code. During the pre-boot phase of boot firmware 122, ACPI firmware 124 communicates available hardware components and their functions to OS 132 using methods provided by boot firmware 122 (UEFI or BIOS). The ACPI firmware 124 uses boot services of boot firmware 122 to construct all ACPI tables, which are used during OS runtime to provide ACPI runtime services to OS 132. The ACPI tables include hooks to all handlers where the ACPI runtime services are called.

According to one embodiment of the present disclosure, ACPI firmware 124 may use boot services of boot firmware 122 to construct a plurality of ACPI tables corresponding to a hardware based watchdog timer (WDT) service. These ACPI tables may include, but are not limited to, a first watchdog timer action table (WDAT) 126 and a second watchdog timer action table (DWDT) 128, as described in more detail below.

As shown in FIG. 1, IHS 100 includes a hardware timer 150 on the system platform that may be used as a hardware based watchdog timer (WDT) service to detect and recover from information handling system malfunctions. Although not strictly limited to such, platform hardware timer 150 may be a Total Cost of Ownership (TCO) timer included within PCH 112, in one embodiment. In other embodiments, platform hardware timer 150 may be another hardware based timer coupled to PCH 112. In some embodiments, platform hardware timer 150 may initialized by boot firmware 122 and used as watchdog timer to monitor the boot process. In such embodiments, the platform hardware WDT 150 may be configured to expire after a predetermined time period (e.g., up to about 5 minutes) that is indicative of a problem with the boot process. If the hardware WDT 150 expires during the boot process, the system may be shut down or rebooted.

In conventional systems including a Microsoft Windows operating system, the boot firmware passes ownership of the hardware WDT to the Windows OS during the boot firmware to OS transition. Prior to handing control to the Windows OS loader, ACPI firmware 124 may use boot services of the boot firmware 122 to create the first watchdog timer action table (WDAT) 126, which is stored in NV memory 120. In conventional systems, boot firmware 122 loads the WDAT 126 within the ACPI configuration space of system memory 110 before platform control is passed to the Windows OS.

WDAT 126 is an industry standard, fixed resource table defined by the ACPI Specification, Version 2.0. As shown in FIG. 2, WDAT 126 contains an ACPI standard header, a Watchdog Header and a Watchdog Action Table. In addition to other information, the ACPI standard header of WDAT 126 includes a table signature (e.g., a 'WDAT' signature) that identifies the table as a Watchdog Timer Action Table. The Watchdog Header of WDAT 126 identifies where the hardware WDT 150 is located (e.g., PCI Segment, Bus Number, Device Number, Function Number), and includes counter values (e.g., a minimum count, maximum count and count period) supported by hardware WDT 150, watchdog flags and number of watchdog instruction entries included within the table. The Watchdog Action Table of WDAT 126 includes a series of one or more watchdog instruction entries. The watchdog instruction entries included within the Watchdog Action Table of WDAT 126 define a watchdog action for OS 132, which is supported by the hardware WDT 150. Example watchdog actions that may be specified in WDAT 126 for OS 132 include:
WATCHDOG_ACTION_RESET
WATCHDOG_ACTION_SET_COUNTDOWN_PERIOD
WATCHDOG_ACTION_QUERY_RUNNING_STATE
WATCHDOG_ACTION_SET_RUNNING_STATE
WATCHDOG_ACTION_QUERY_STOPPED_STATE
WATCHDOG_ACTION_SET_STOPPED_STATE
WATCHDOG_ACTION_QUERY_WATCHDOG_STATUS
WATCHDOG_ACTION_SET_WATCHDOG_STATUS
When a watchdog action includes more than one watchdog instruction, the watchdog instructions are listed consecutively and performed sequentially according to their placement in the Watchdog Action Table. A watchdog action is complete when all watchdog instructions in the list have been successfully performed.

In conventional systems running Microsoft Windows operating systems, the Microsoft Windows OS loader looks for the 'WDAT' signature in the ACPI Header Signature of WDAT 126 to determine if the WDAT 126 is stored within the ACPI configuration space of system memory 110. If WDAT 126 is found in system memory 110, the OS loader reserves the hardware WDT 150 for sole use by the OS kernel 134 during OS runtime, and prevents other user applications 140, drivers and services from accessing and using the services of hardware WDT 150 during OS runtime. Since user applications 140 cannot access hardware WDT 150, they are limited to using software based WDT services provided by the Microsoft Windows operating system. Unfortunately, software based WDT services provided by the OS may leave the system in an indefinite hung state if an OS hang condition, intentional termination of the software WDT, or OS fault occurs. This may present an unacceptable amount of risk for some user applications 140, which are critical and/or security sensitive.

To overcome this limitation, information handling systems and methods are provided herein to selectively control ownership of the hardware WDT 150 during OS runtime. As described in more detail below, the disclosed systems and methods enable a user, system administrator or platform owner (collectively referred to herein as a "user") to select whether hardware WDT 150 will be controlled/owned/used by OS 132 or user application(s) 140 during OS runtime. If user application-ownership is selected, the disclosed systems and methods prevent the OS kernel 134 from taking ownership of hardware WDT 150 during the boot firmware to OS transition. In addition to enabling user application-ownership of hardware WDT 150, the disclosed systems and methods control which user application(s) 140 are authorized to use the hardware WDT, and in some embodiments, may allow multiple user applications 140 to share and use the hardware WDT at substantially the same time. Further details of the systems and methods disclosed herein are illustrated in FIGS. 1 and 3-7.

As shown in FIGS. 1 and 3-6, the present disclosure provides a boot setup utility 123 within the boot firmware 122 that enables a user to select between OS-ownership and user application-ownership of hardware WDT 150 during OS runtime. If user application-ownership is selected, the present disclosure enables boot firmware 122 and ACPI firmware 124 to construct a second watchdog timer action table (DWDT) 128 to define watchdog services for one or more authorized user applications 140. Finally, the present disclosure provides a watchdog driver (WDT_DRV) 138 and a watchdog application program interface (WDT_API) 136 to enable the authorized user applications 140 to access and use the hardware WDT 150 during OS runtime. As described in more detail below, WDT_API 136 includes program instructions that may be executed by host processing device 102 to authorize one or more user applications 140 to use the hardware WDT 150 during OS runtime. WDT_DRV 138 includes program instructions, which when executed by host processing device 102, enable only the user application(s) 140 that have been authorized by WDT_API 136 to access, configure and use the hardware WDT 150 during OS runtime.

Like the first watchdog timer action table (WDAT) 126 specified for OS 132, the second watchdog timer action table (DWDT) 128 is an industry standard, fixed resource table, which is defined by the ACPI Specification, Version 2.0 and constructed by ACPI firmware 124 and stored in NV memory 120 during the pre-boot phase of boot firmware 122. Unlike the first watchdog timer action table (WDAT) 126, the second watchdog timer action table (DWDT) 128 includes a non-standard or unregistered header signature ('DWDT') and watchdog action(s) specified for the authorized user application(s) 140, not the OS 132.

As shown in FIG. 3, DWDT 128 contains an ACPI standard header, a watchdog header and a watchdog action table. In addition to other information, the ACPI standard header of DWDT 128 includes a header signature (e.g., a 'DWDT' signature) that identifies the table as a Watchdog Timer Action Table. The Watchdog Header of DWDT 128 identifies the address location of the hardware WDT 150 (e.g., PCI Segment, Bus Number, Device Number, Function Number), and includes counter values (e.g., a minimum count, maximum count and count period) supported by hardware WDT 150, watchdog flags and number of watchdog instruction entries included within the table. The Watchdog Action Table of DWDT 128 includes a series of one or more watchdog instruction entries. WDT_DRV 138 looks for the 'DWDT' signature in the ACPI header signature of DWDT 128 to determine if the DWDT 128 is stored within the ACPI configuration space of system memory 110.

The watchdog instruction entries included within the Watchdog Action Table of DWDT 128 define the watchdog action, which is specified for the authorized user application(s) 140 and performed when the hardware WDT 150 expires or reaches a timeout value. Information within DWDT 128, such as the minimum count, maximum count and count period supported by hardware WDT 150, may be used to calculate the timeout value (in count intervals) desired by the authorized user application(s) 140. The calculated timeout value may be written to a register specified by the address location of the hardware WDT in the Watchdog Header of DWDT 128 to configure the WDT with the desired timeout. In some embodiments, one or more user application(s) 140 may use the same timeout value. In other embodiments, multiple user applications 140 may share the hardware WDT 150, but specify different timeout values.

The Watchdog Action Table of DWDT 128 includes a series of one or more watchdog instruction entries. The watchdog instruction entries included within the Watchdog Action Table of DWDT 128 define a watchdog action for authorized user application(s) 140, which is supported by the hardware WDT 150. Example watchdog actions that may be specified in DWDT 128 for authorized user application(s) 140 include, but are not limited to:

WATCHDOG_ACTION_RESET;
WATCHDOG_ACTION_QUERY_CURRENT_COUNTDOWN_PERIOD;
WATCHDOG_ACTION_QUERY_COUNTDOWN_PERIOD;
WATCHDOG_ACTION_SET_COUNTDOWN_PERIOD;
WATCHDOG_ACTION_QUERY_RUNNING_STATE;
WATCHDOG_ACTION_SET_RUNNING_STATE;
WATCHDOG_ACTION_QUERY_STOPPED_STATE;
WATCHDOG_ACTION_SET_STOPPED_STATE;
WATCHDOG_ACTION_QUERY_REBOOT;
WATCHDOG_ACTION_SET_REBOOT;
WATCHDOG_ACTION_QUERY_SHUTDOWN;
WATCHDOG_ACTION_SET_SHUTDOWN;
WATCHDOG_ACTION_QUERY_WATCHDOG_STATUS;
WATCHDOG_ACTION_SET_WATCHDOG_STATUS.

When a watchdog action includes more than one watchdog instruction, the watchdog instructions are listed consecutively and performed sequentially according to their placement in the watchdog action table. A watchdog action is complete when all watchdog instructions in the list have been successfully performed.

In some embodiments, the watchdog action specified in DWDT 128 may halt all processing upon WDT timeout. In one example, the watchdog action specified in DWDT 128 may cause the IHS to immediately shutdown, pull the power rails down, or force a platform/PCI reset. In another example, the watchdog action specified in DWDT 128 may cause a forced, yet orderly shutdown of the operating system and/or IHS to minimize the risk of OS/data corruption.

Figure 4:
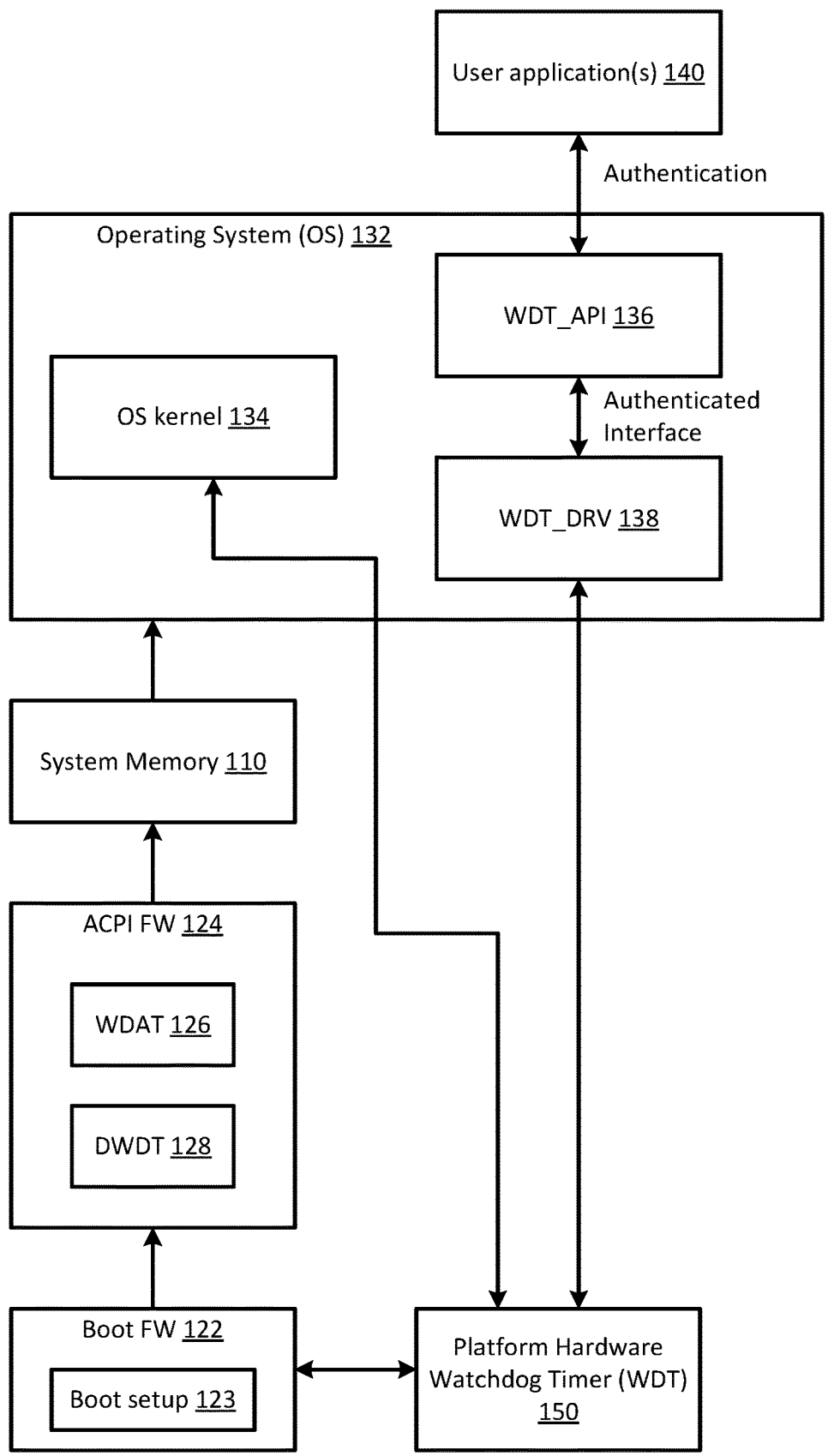
FIG. 4 is a functional block diagram illustrating how components of the IHS shown in FIG. 1 may interact to selectively control ownership of the hardware WDT during OS runtime.
Figure 5:
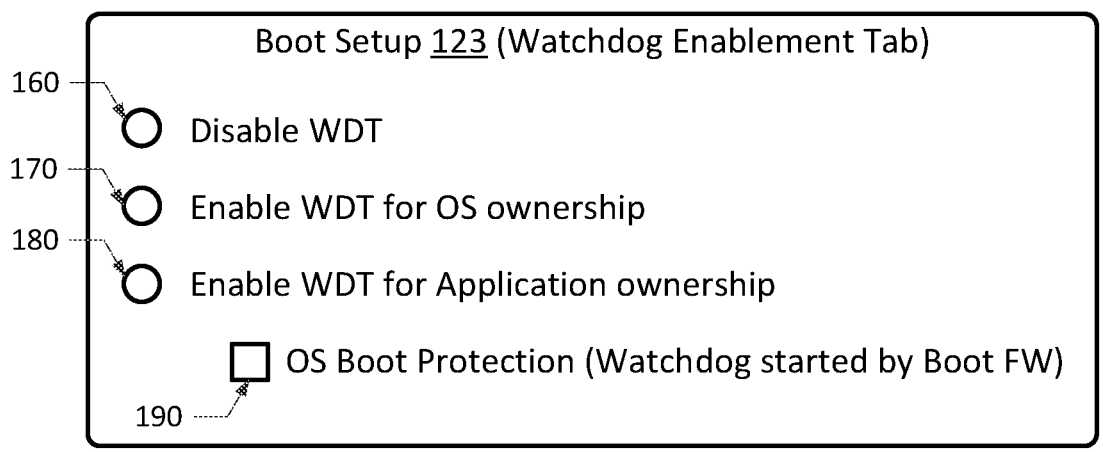
FIG. 5 is a graphical representation of a boot setup utility, which allows a user to enable/disable the hardware WDT and to select ownership of the hardware WDT during OS runtime.

FIG. 4 is a functional block diagram illustrating various components of IHS 100 that are provided in the present disclosure to select ownership of the hardware WDT 150 during OS runtime. As noted above, boot firmware 122 may include a boot setup utility 123 that enables a user, system administrator or platform owner (collectively referred to herein as a "user") to specify hardware configuration settings, system time, boot sequence, and other aspects of the boot process. As shown in FIG. 5, boot setup utility 123 may include a Watchdog Enablement Tab, which allows the user to enable/disable hardware WDT 150 and to selectively control ownership of the hardware WDT during OS runtime.

In some embodiments, the hardware WDT 150 may be initiated by boot firmware 122 and used to monitor the boot process if "OS Boot Protection" 190 is selected by the user in the Watchdog Enablement Tab of boot setup utility 123. After the boot process completes and platform control is handed off to OS 132, the hardware WDT 150 may be disabled, enabled for OS ownership, or enabled for Application ownership, depending on the settings selected in the Watchdog Enablement Tab of the boot setup utility 123.

In some embodiments, hardware WDT 150 may be disabled during OS runtime by selecting "Disable WDT" 160 in the Watchdog Enablement Tab of boot setup utility 123. If the hardware WDT 150 is enabled for use during OS runtime, the user may select: "Enable WDT for OS ownership" 170 or "Enable WDT for Application ownership" 180. If "Enable WDT for OS ownership" 170 is selected, hardware WDT 150 is enabled, WDAT 126 is loaded into system memory 110 at system reboot, and the OS kernel 134 takes ownership of the hardware WDT 150 during OS runtime. If "Enable WDT for Application ownership" 180 is selected, hardware WDT 150 is enabled, DWDT 128 is loaded into system memory 110 at system reboot, and the WDT_DRV 138 takes ownership of the hardware WDT 150 during OS runtime.

If "Enable WDT for Application ownership" 180 is selected, the user may choose to allow one (or multiple) authorized user application(s) to access and use hardware WDT 150 during OS runtime. The watchdog application program interface (WDT_API) 136 is an OS level service that controls/authorizes which user application(s) 140 can bind to the watchdog driver (WDT_DRV) 138. As such, WDT_API 136 provides an authenticated interface to WDT_DRV 138 for one or more user applications 140 that have been authenticated by the watchdog application program interface. WDT_DRV 138 is an OS level service, which uses table entries in DWDT 128 to configure and support the hardware WDT 150 during OS runtime. If the hardware WDT 150 reaches the timeout value(s) specified for the authorized application(s) 140, WDT_DRV 138 may set one or more watchdog flags in the Watchdog Header, and perform the watchdog action specified in the Watchdog Action Table, of DWDT 128.

According to one embodiment, WDT_API 136 may use a cryptographic binding mechanism to authenticate one or more user applications 140 and to enable only authenticated applications to bind to and access the WDT_DRV 138. In one example, a user application 140 may initiate the authentication process by calling WDT_API 136 and providing a unique identifier and a binding key to the WDT_API. The unique identifier may include substantially any data string that uniquely identifies a user application 140 or a vendor that created the user application. In one example, the unique identifier may be an industry standard vendor ID. In another example, the unique identifier may be one which is provided by the manufacturer of the information handling system for the vendor's use.

The binding key may be a shared secret key provided, for example, by the manufacturer of the information handling system to a user application 140 or a vendor that created the user application. In one example, the binding key may be a hash-based message authentication code (HMAC), which is a type of message authentication code involving a cryptographic hash function and a secret key. In one implementation, the unique identifier may be hashed with a private key maintained, for example, by the manufacturer of the information handling system. In such an implementation, the HMAC'd key may be provided to the user application 140 or the vendor as the binding key.

As noted above, a user application 140 may provide the unique identifier and the binding key to WDT_API 136 when the application calls the WDT_API. In some embodiments, the user application 140 may be authenticated and granted access to the WDT_DRV 138 if the unique identifier and binding key provided by the user application match a corresponding identifier and binding key set maintained by the WDT_API 136. If no match exists, an error code may be returned and the user application is not permitted to access the WDT_DRV 138.

In some embodiments, the identifier/binding key set maintained by the WDT_API 136 may be stored in a secure database, which is only accessible to the WDT_API 136. In other embodiments, additional precautions may be taken to prevent malicious software from accessing and tampering with the identifier/binding key sets. For example, a Trusted Platform Module (TPM) can be used to store a key used to access/decrypt the secure database of identifiers/binding keys. Furthermore, a Use of Windows Virtualization Based Security or Intel processor SGX capability can be used to keep the identifier/binding key database stored in area that is inaccessible to any other OS software and to perform the matching within a virtualized container or SGX Enclave.

In some embodiments, WDT_API 136 may allow a multiple user applications 140 to simultaneously share hardware WDT 150 by authenticating and binding the multiple user applications to the WDT_DRV 138. In order to do so, each user application 140 must provide a unique identifier and binding key to the WDT_API 136 that corresponds to a matched set maintained by the WDT_API 136.

In some embodiments, a plurality of user applications 140, which have been authorized by WDT_API 136 to share the hardware WDT 150, may agree to use the same timeout value (i.e., expiration time for tripping the WDT) and watchdog actions specified in DWDT 128. In other embodiments, one or more authorized user applications 140 may request a different timeout value and/or a different watchdog action than used by other authorized user applications 140 sharing the hardware WDT 150. In one embodiment, a different timeout value may be specified for one or more authorized user applications 140 by setting a desired countdown period via WDT_API 136.

By providing a cryptographic binding mechanism between user applications 140 and WDT_DRV 138, WDT_API 136 controls which applications can use the hardware 150 during OS runtime and enables secured sharing of the hardware WDT between multiple authorized user applications. In doing so, WDT_API 136 prevents malicious software from terminating an authorized user application 140 and either assuming its identity or causing a DOS attack and platform restart.

Figure 6:
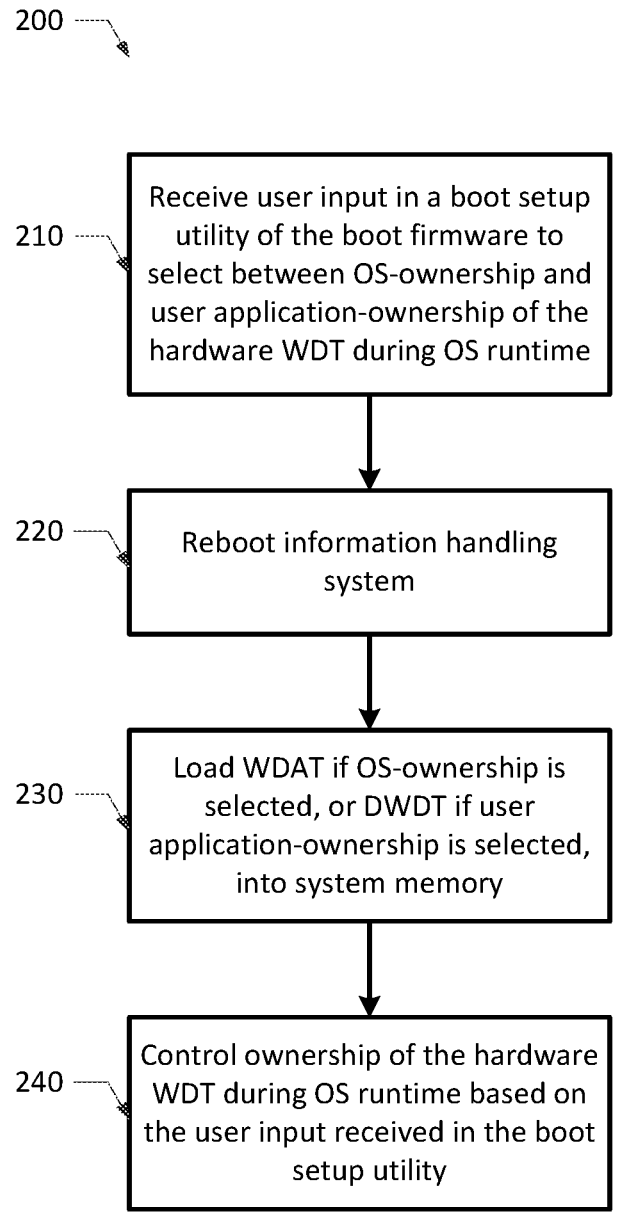
FIG. 6 is a flowchart diagram illustrating one embodiment of a method to selectively control ownership of a hardware WDT during OS runtime.

FIG. 6 is a flowchart diagram illustrating one embodiment of a method 200 to selectively control ownership of a hardware watchdog timer (e.g., hardware WDT 150) during OS runtime. The method shown in FIG. 6 is a computer implemented method performed, at least in part, by execution of program instructions contained within boot firmware 122, ACPI firmware 124 and/or operating system 132 of IHS 100. Unlike conventional information handling systems, the computer implemented method shown in FIG. 6 improves the way in which IHS 100 functions, at the very least, by enabling a user to select whether the hardware WDT will be controlled/owned/used by the operating system or one or more user applications during OS runtime. If user application-ownership is selected, the method shown in FIG. 6 prevents the OS from taking ownership of the hardware WDT during the boot firmware to OS transition.

According to one embodiment, method 200 may begin (in step 210) by receiving user input in a boot setup utility of the boot firmware to select between OS-ownership and user application-ownership of the hardware WDT during OS runtime. As noted above, a user, system administrator or platform owner may select ownership of the hardware WDT in the boot setup utility. After ownership is selected (in step 210), the information handling system may be rebooted (in step 220). In response to said rebooting, the method may load either a first watchdog timer action table (WDAT) specified for the operating system or a second watchdog timer action table (DWDT) specified for the one or more user applications into a system memory of the information handling system (in step 230). For example, the first watchdog timer action table (WDAT) may be loaded into system memory (in step 230) if the received user input selects OS-ownership in the boot setup utility. On the other hand, if the received user input selects user application-ownership in the boot setup utility, the second watchdog timer action table (DWDT) may be loaded into system memory (in step 230).

In step 240, the method may control ownership of the hardware WDT during OS runtime based on the user input received in the boot setup utility. For example, if OS-ownership is selected in the boot setup utility, the method enables the operating system to take ownership of the hardware WDT during OS runtime. On the other hand, if user application-ownership is selected in the boot setup utility, the method prevents the operating system from taking ownership of the hardware WDT during OS runtime, and instead, enables one or more user applications to take ownership of the hardware WDT during OS runtime. In some embodiments, the method shown in FIG. 6 may allow only authorized user applications to take ownership of the hardware WDT during OS runtime.

Figure 7:
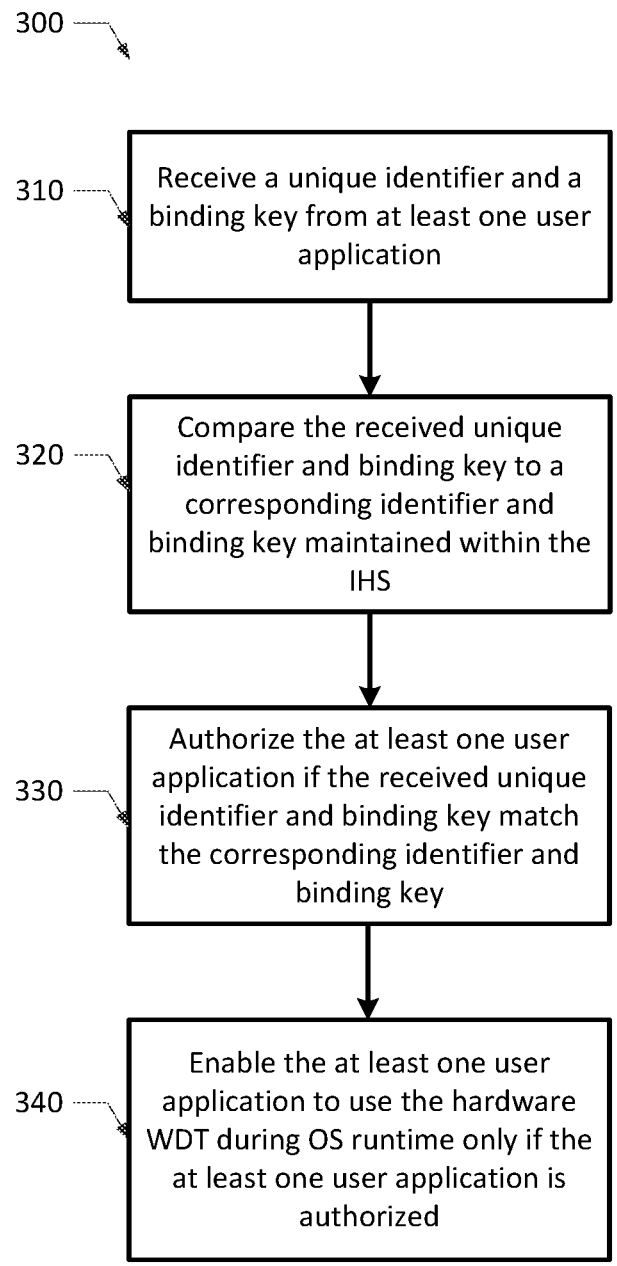
FIG. 7 is a flowchart diagram illustrating one embodiment of a method to authorize one or more user applications to use a hardware WDT during OS runtime.

FIG. 7 is a flowchart diagram illustrating one embodiment of a method 300 to authorize one or more user applications to use a hardware watchdog timer (WDT) during OS runtime. The method shown in FIG. 7 is a computer implemented method performed, at least in part, by execution of program instructions contained within an OS level service (e.g., a watchdog application program interface, WDT_API) of IHS 100. Unlike conventional information handling systems, the computer implemented method shown in FIG. 7 improves the way in which IHS 100 functions, at the very least, by controlling which user application(s) are authorized to use the hardware WDT during OS runtime, and preventing unauthorized user applications from taking ownership of the hardware WDT. In addition to authorizing user applications, the computer implemented method shown in FIG. 7 may also allow multiple user applications to share and use the hardware WDT at substantially the same time.

According to one embodiment, method 300 may begin by receiving a unique identifier and a binding key from at least one user application (in step 310), and comparing the received unique identifier and binding key to a corresponding identifier and binding key maintained within the information handling system (in step 320). As noted above, unique identifier may include substantially any data string that uniquely identifies the at least one user application or a vendor that created the user application. The binding key may be a shared secret key or a hash-based message authentication code (HMAC) provided, for example, by a manufacturer of the information handling system to the user application or vendor that created the user application. In one implementation, the unique identifier may be hashed with a private key, and the HMAC'd key may be provided to the user application or the vendor as the binding key.

Method 300 may authorize the at least one user application (in step 330) if the received unique identifier and binding key match the corresponding identifier and binding key maintained with the IHS, and may enable the at least one user application to use the hardware WDT during OS runtime (in step 340) only if the at least one user application is authorized in step 330. If the at least one user application is authorized (in step 330), the at least one user application may be enabled (in step 340) by binding the at least one user application to a watchdog timer driver (WDT_DRV), which is configured to access, configure and use the hardware WDT during OS runtime.

It will be understood that one or more of the tasks, functions, or methodologies described herein may be implemented, for example, as firmware or as a computer program of instructions embodied in a non-transitory tangible computer readable medium that is executed by a CPU, controller, microcontroller, processor, microprocessor, FPGA, ASIC, or other suitable processing device.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. An information handling system (IHS), comprising:
    a hardware watchdog timer (WDT) provided on a system platform of the IHS;
    a computer readable storage medium configured to store an operating system (OS), a plurality of user applications and a watchdog timer driver;
    a computer readable non-volatile memory configured to store boot firmware having a boot setup utility, which enables a user to select between OS-ownership and user application-ownership of the hardware WDT during OS runtime; and
    a host processing device configured to execute program instructions within the boot firmware when the IHS is booted before the OS is loaded into a system memory of the IHS and executed by the host processing device during OS runtime;
    wherein when user application-ownership of the hardware WDT is selected in the boot setup utility, program instructions within the watchdog timer driver are executed by the host processing device to enable one or more of the user applications to use the hardware WDT during OS runtime.

2. The information handling system as recited in claim 1, wherein when OS-ownership of the hardware WDT is selected in the boot setup utility, the operating system retains sole access to and use of the hardware WDT during OS runtime.

3. The information handling system as recited in claim 1, wherein the computer readable non-volatile memory is further configured to store:
    a first watchdog timer action table (WDAT) specified for the operating system, wherein the first watchdog timer action table is loaded into the system memory when the IHS is booted if the user selects OS-ownership of the hardware WDT in the boot setup utility; and
    a second watchdog timer action table (DWDT) specified for the one or more user applications, wherein the second watchdog timer action table is loaded into the system memory when the IHS is booted if the user selects user application-ownership of the hardware WDT in the boot setup utility.

4. The information handling system as recited in claim 3, wherein the first watchdog timer action table (WDAT) and the second watchdog timer action table (DWDT) are Advanced Configuration and Power Interface (ACPI) watchdog timer action tables.

5. The information handling system as recited in claim 3, wherein the second watchdog timer action table (DWDT) specifies at least one watchdog action to be performed for the one or more user applications if the hardware WDT reaches at least one timeout value, which is specified for the one or more user applications and used to configure the hardware WDT.

6. The information handling system as recited in claim 5, wherein the at least one timeout value comprises a first timeout value specified for a first one of the user applications and a second timeout value specified for a second one of the user applications, wherein the second timeout value differs from the first timeout value.

7. The information handling system as recited in claim 1, further comprising a watchdog application program interface, which is stored within the computer readable storage medium and comprises program instructions that are executable by the host processing device to control access to the watchdog timer driver.

8. The information handling system as recited in claim 7, wherein the program instructions of the watchdog application program interface are executable by the host processing device to authorize one or more user applications and allow only the authorized user applications to access the watchdog timer driver during OS runtime.

9. The information handling system as recited in claim 8, wherein the program instructions of the watchdog application program interface are executable by the host processing device to authorize multiple user applications to access the watchdog timer driver and share the hardware WDT during OS runtime.

10. The information handling system as recited in claim 8, wherein the program instructions of the watchdog application program interface are executable by the host processing device to:
    authorize at least one user application if a unique identifier and a binding key provided by the at least one user application matches a corresponding identifier and binding key maintained by the watchdog application program interface; and bind the at least one user application to the watchdog timer driver only if the at least one user application is authorized.

11. The information handling system as recited in claim 10, wherein the unique identifier comprises a data string that uniquely identifies the at least one user application or a vendor that created the user application.

12. The information handling system as recited in claim 10, wherein the binding key is a shared secret key provided by a manufacturer of the IHS to the at least one user application.

13. The information handling system as recited in claim 10, wherein the binding key is a hash-based message authentication code (HMAC), which is generated by hashing the unique identifier with a private key maintained by a manufacturer of the IHS.

14. A method to selectively control ownership of a hardware watchdog timer (WDT) provided on a system platform of an information handling system (IHS), which is configured to store and execute boot firmware, an operating system (OS) and one or more user applications, wherein the method comprises:

receiving user input in a boot setup utility of the boot firmware to select between OS-ownership and user application-ownership of the hardware WDT during OS runtime; and controlling ownership of the hardware WDT during OS runtime based on the user input received in the boot setup utility.

15. The method as recited in claim 14, further comprising rebooting the IHS after said receiving user input and before said controlling ownership of the hardware WDT, wherein in response to said rebooting, the method comprises:

loading a first watchdog timer action table (WDAT) specified for the operating system into a system memory of the IHS if the received user input selects OS-ownership in the boot setup utility; and loading a second watchdog timer action table (DWDT) specified for the one or more user applications into the system memory if the received user input selects user application-ownership in the boot setup utility.

16. The method as recited in claim 14, further comprising authorizing at least one user application to use the hardware WDT during OS runtime before said controlling ownership of the hardware WDT during OS runtime.

17. The method as recited in claim 16, further comprising authorizing a plurality of user applications to share the hardware WDT during OS runtime before said controlling ownership of the hardware WDT during OS runtime.

18. The method as recited in claim 16, wherein said authorizing comprises:

comparing a unique identifier and a binding key provided by the at least one user application to a corresponding identifier and binding key maintained within the IHS;

authorizing the at least one user application if the unique identifier and the binding key provided by the at least one user application match the corresponding identifier and binding key maintained within the IHS; and enabling the at least one user application to use the hardware WDT during OS runtime only if the at least one user application is authorized.

19. A method to authorize one or more user applications to use a hardware watchdog timer (WDT) provided on a system platform of an information handling system (IHS) comprising an operating system (OS) and the one or more user applications, wherein the method comprises:

comparing a unique identifier and a binding key provided by at least one user application to a corresponding identifier and binding key maintained within the IHS;

authorizing the at least one user application if the unique identifier and the binding key provided by the at least one user application match the corresponding identifier and binding key maintained within the IHS; and enabling the at least one user application to use the hardware WDT during OS runtime only if the at least one user application is authorized.

20. The method as recited in claim 19, wherein if the at least one user application is authorized, said enabling comprises binding the at least one user application to a watchdog timer driver, which is configured to access, configure and use the hardware WDT during OS runtime.

* * * * *